US007228866B2

(12) United States Patent
Cornelius et al.

(10) Patent No.: US 7,228,866 B2
(45) Date of Patent: Jun. 12, 2007

(54) RINSING DEVICE FOR A SEALING SYSTEM, AND PROCESS FOR USING THE SAME

(75) Inventors: Hans-Dieter Cornelius, Dresden (DE); Heinz Pritzke, Kesselsdorf OT Braunsdorf (DE)

(73) Assignee: Glatt Systemtechnik GmbH, Dresden (DE)

( * ) Notice: Subject to any disclaimer, the term of this patent is extended or adjusted under 35 U.S.C. 154(b) by 465 days.

(21) Appl. No.: 10/362,216

(22) PCT Filed: Sep. 27, 2001

(86) PCT No.: PCT/DE01/03753

§ 371 (c)(1),
(2), (4) Date: Feb. 26, 2003

(87) PCT Pub. No.: WO02/27219

PCT Pub. Date: Apr. 4, 2002

(65) Prior Publication Data

US 2003/0227141 A1    Dec. 11, 2003

(51) Int. Cl.
*F16J 15/02* (2006.01)
*B08B 3/00* (2006.01)
(52) U.S. Cl. ............... 134/166 R; 134/22.1; 277/641
(58) Field of Classification Search ................ 277/641, 277/642, 645; 134/166 R
See application file for complete search history.

(56) References Cited

U.S. PATENT DOCUMENTS 3,570,510 A    3/1971    Tsutsumi 4,610,319 A  *  9/1986  Kalsi ......................... 175/371
6,109,618 A  *  8/2000  Dietle ........................ 277/559

FOREIGN PATENT DOCUMENTS

| DE | 3229841 | 2/1984 |
|----|---------|--------|
| DE | 3509352 | 9/1986 |
| DE | 19652169 | 6/1998 |
| DE | 19652169 A1 * | 6/1998 |
| GB | 1217391 | 12/1970 |
| JP | 11270700 | 10/1999 |

* cited by examiner

*Primary Examiner*—Michael Barr
*Assistant Examiner*—Sarah E. Husband
(74) *Attorney, Agent, or Firm*—Jacobson Holman PLLC

(57) ABSTRACT

The invention relates to a flushing device for a sealing system on a housing element with a sealing surface and an associated closing element with a radially outer elastic seal, comprising at least one source for a flushing medium, an annular channel arranged in the housing element, and an annular gap, out of which the flushing medium can pass, the annular gap being closed by the radially outer elastic seal in the closed position of the closing element. At least one further closable outlet is provided for the flushing medium on the annular channel. At least one side of the opening of the annular gap is of undulating or serrated design.

In accordance with the process for using the flushing device, with the closing element closed and the annular gap closed and with the further outlet open, a flushing medium is let into the annular channel from the source and is let out via the further outlet.

6 Claims, 2 Drawing Sheets

RINSING DEVICE FOR A SEALING SYSTEM, AND PROCESS FOR USING THE SAME

This is a nationalization of PCT/DE01/03753, filed Sep. 27, 2001 and published in German.

TECHNICAL FIELD

The invention relates to a flushing device for a sealing system of a housing and associated closing element and a method of use therefor.

PRIOR ART

DE 19652169 A1 discloses a sealing device, with a housing element and a closing element, which has a flushing device. The flushing device encloses the entire region of the sealing surface on the housing element and/or of the seal on the closing element such that a flushing medium which, at least immediately before the sealing position is reached, is passed through the flushing device flows round the sealing surface and/or the seal and, in the process, removes impurities which are present in the sealing region. The disadvantage here is that parts of the flushing device are at least temporarily in a relatively open state.

Such flushing devices are used, in particular, wherever sensitive materials, mostly pulverulent or granular materials, e.g. in the pharmaceutical industry, are transferred. The flushing medium which is mostly used is air.

It has been found in practice that, for example, pharmaceutical powder also penetrates, as deposits, into the flushing device, i.e. the channels thereof. There, the powder becomes lodged in particular in corners and is difficult to remove again. It has also been found that homogeneous flushing-gas streams are often effective only to an insufficient extent.

DESCRIPTION OF THE INVENTION

It is thus an object of the invention to provide a flushing device of the type mentioned in the introduction which allows effective cleaning of the entire sealing system even within the technical procedure. It is also an object of the invention to specify a process for using the device according to the invention.

Advantageous developments of the invention are defined in the respective subclaims and are illustrated in more detail hereinbelow together with the description of the preferred embodiment of the invention, including the drawing.

The core of the invention is that the flushing device itself is designed in a specific manner as a closed system, at least one further closable outlet is provided for the flushing medium, and at least one side of the opening of the annular gap is of undulating or serrated design.

The further closable outlet for the flushing medium is advantageously configured directly in combination with the inlet of the flushing medium and is connected to a collecting container in order that the contaminated residues of the flushing medium can be post-treated separately to the extent which is necessary from a technical point of view.

By virtue of the undulating or serrated design of the annular gap, the stream of flushing medium passing out of the annular gap acts particularly effectively on residues of the transferred material and flushes these residues from the respective surfaces.

During normal operation, i.e. if the sealing system is to be flushed, a particularly high level of uniformity of the parameters governing the flushing medium passing out of the annular gap may be achieved. This results from the flushing medium entering and exiting an annular channel at two different locations.

Novel advantageous effects are achieved by the flushing device according to the invention. The respective material transferred, in practice, cannot penetrate into the internal spaces of the flushing device, and the internal spaces may advantageously be cleaned by one or more flushing media.

The cleaning of the flushing device itself can take place within the technical process, as a result of which stringent cleanness-related requirements are fulfilled.

As far as the process is concerned, the flushing device itself, but at least the annular channel, is cleaned at a point in time at which, in respect of its actual purpose, namely of cleaning the sealing system, it is not in operation, i.e. when the radially outer elastic seal on the closing element closes the opening of the annular gap for the outflow of the flushing medium. For this purpose, the flushing medium which is normally used, or some other flushing medium, is passed from the source, via the annular channel, to the further outlet for the flushing medium.

The process-related use of the flushing device may be varied. Accordingly, it is possible, by means of one flushing medium or by means of two flushing media, for the annular channel and the connecting lines to be flushed in one direction as well as alternately in both directions. The greatest level of effectiveness is achieved if first of all the normally used gaseous flushing medium is passed through the annular channel in one direction, then a liquid flushing medium is passed through a number of times in both directions and, finally, a gaseous flushing medium is passed through again in order to dry the annular channel and the connecting line.

The invention is explained in more detail hereinbelow with reference to an exemplary embodiment.

FIG. 1 of the drawing shows an overall view of a flushing device according to the invention on a coupling half.

The flushing device according to the invention is located, for example, on a coupling device for transferring a pharmaceutical powder from a transporting container into a technical device, which is arranged therebeneath during the transfer. Both the transporting container and the technical device each have the same type of coupling device. On the flange of the coupling device, pivoting flaps are arranged directly at the sealing plane.

When the transporting container and the technical device stand alone, the pivoting flaps are closed in the associated flanges. In this closed position, the transporting container is coupled to the technical device.

Figure 1:
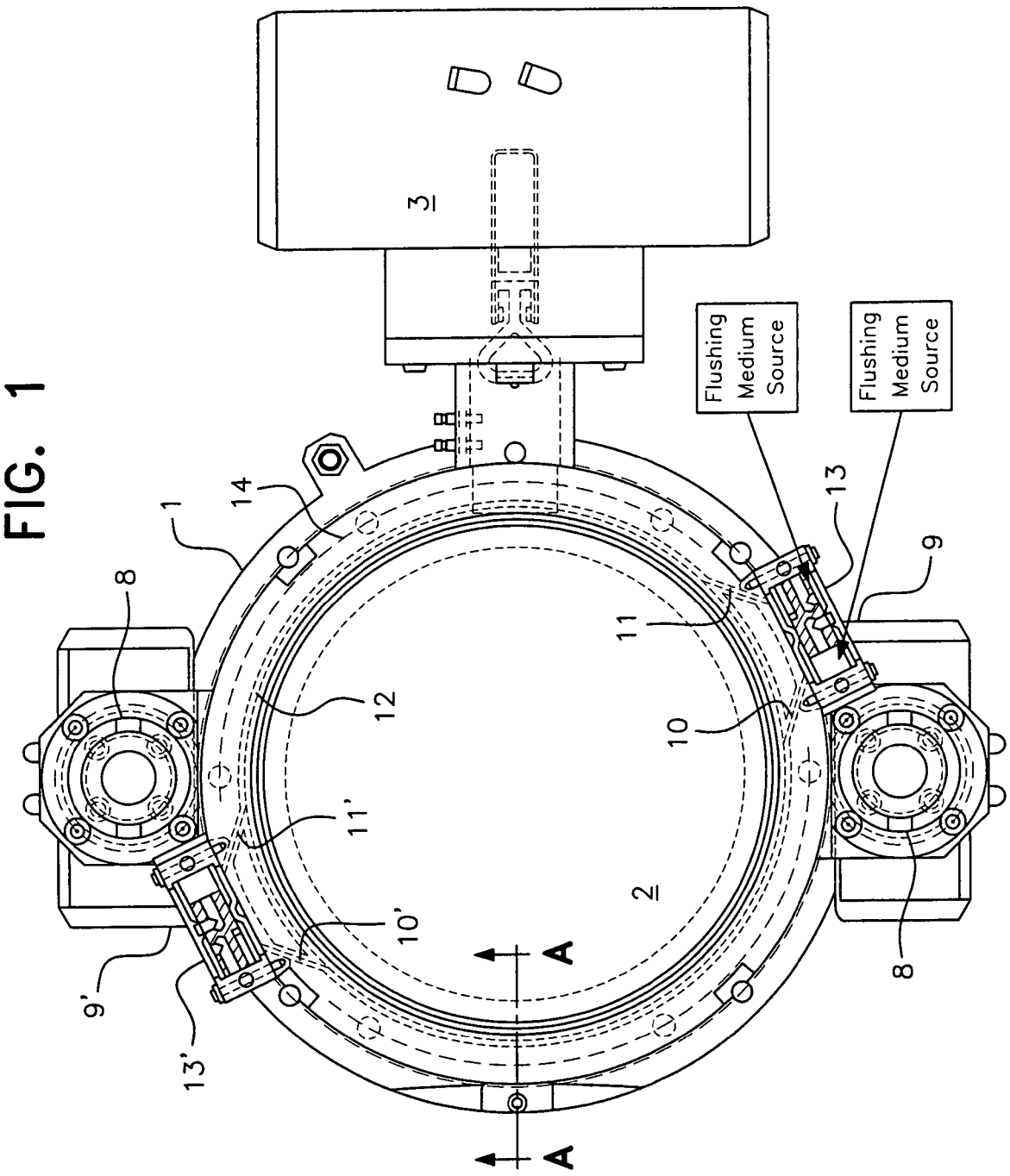

FIG. 1 shows a plan view of a coupling device. Within a flange 1, as housing element, a closing flap 2 is mounted as the closing element. The closing flap 2 may be pivoted through 90° by means of a pivoting drive 3. Prior to the uncoupling of the coupling devices, the internal spaces 5 of the radially outer seals 4 on the closing flaps 2 are subjected to an internal positive pressure via the compressed-air generator. As a result, the radially outer seals 4 widen and position themselves firmly against the respective sealing surfaces 6 in the flange 1.

As can also be seen from FIG. 1, two centering devices 8 are provided on the coupling device, these ensuring, via centering bolts, that two coupling devices are always coupled in a defined central position in relation to one another.

Furthermore, two valves 9 and 9' are located opposite one another, these being connected, on the one hand, via two respective connecting lines 10 and 11, 10' and 11', to an annular channel 12 and, on the other hand, to a compressed-air source (not illustrated) and a water connection. The valves 9 and 9' each have a respective slide 13, 13'. These slides 13 and 13' can be moved into two end positions and an intermediate position. In the intermediate position, the connecting lines 10 and 11, 10' and 11' are closed. That is to say, in this position, the annular channel 12 is not connected either to the compressed-air source or to the water connection. If the slides 13 and 13' are located in one of the end positions, the annular channel is connected, via the respective connecting lines 10 and 10', to the compressed-air generator on one or both sides and, via the respective connecting lines 11 and 11', to the water connection.

Figure 2:
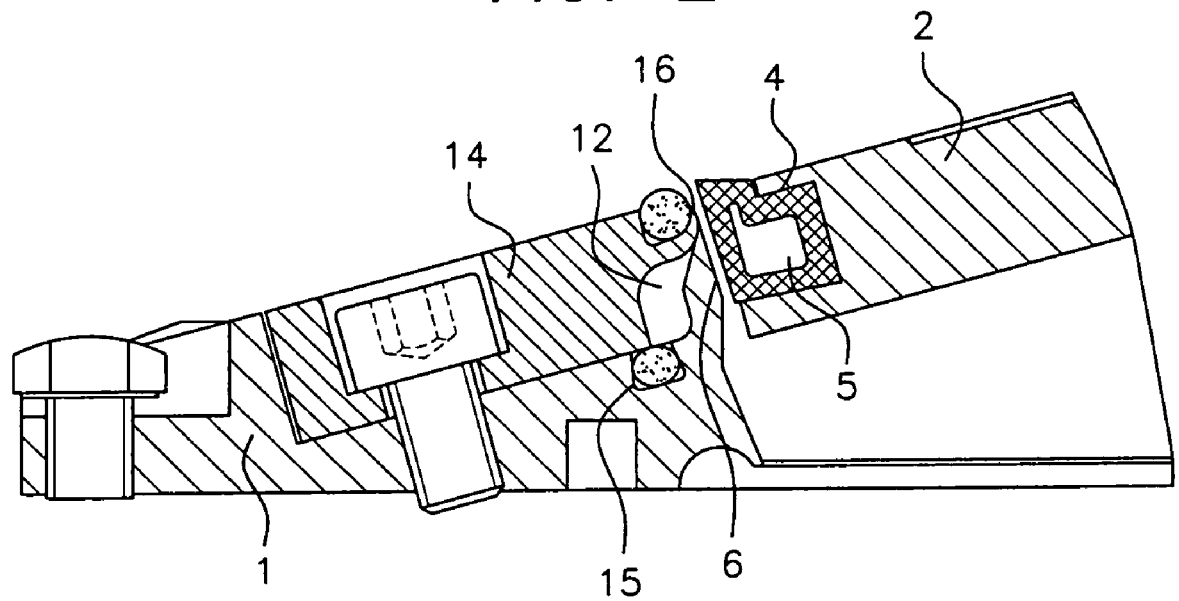
FIG. 2 shows a view, in detail form, in the region of the annular gap of the flushing device, in section A—A in FIG. 1.

The further closable flushing-medium outlet according to the invention is realized in the example in each case directly via the valves 9 and 9'. In this case, the used flushing medium flowing out is fed to a separate collecting container. FIG. 2 shows a view, in detail form, of the flushing device in section A—A in FIG. 1. The closing flap 2 is located in the closed position. A radially outer seal 4 has an internal space 5 which is connected to a compressed-air generator. In FIG. 2, the seal 4 is located in a position opposite a sealing surface 6 on the flange 1, without the two elements butting firmly against one another. It is thus possible for the closing flap 2 to be pivoted freely. If two coupling devices of the same type are coupled to one another, the respective flanges 1 and closing flaps 2 butt closely against one another and can be pivoted together.

As can also be seen in FIG. 2, the annular channel 12 is formed by a specific recess in the flange 1 and a corresponding recess in a covering plate 14. The recesses here are configured such that no corners, edges or undercuts are produced. The covering plate 14 and the flange 1 are sealed in relation to one another via an annular seal 15. As a result, the annular channel 12 is closed on all sides and only has an annular gap 16 between the seal 4 and the sealing surface 6.

Figure 3:
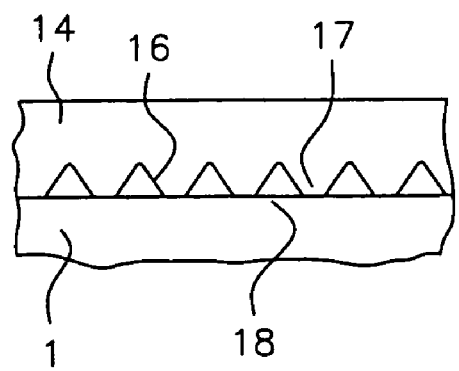
FIG. 3 shows a plan view of the annular gap in FIG. 2.

FIG. 3 illustrates a plan view of the annular gap 16 as seen from the closing plate 2. It can be seen from this that, in the exemplary embodiment, the annular gap 16 is formed by a smooth outlet edge 18 on the flange 1 and a serrated edge 17 on the covering plate 14. This produces, in practice, a multiplicity of parallel openings which, by virtue of the configuration of the annular channel 12, are of a nozzle-like design. The flushing-medium stream which leaves the annular channel 12 via the annular gap 16 thus comprises, in practice, a multiplicity of parallel jets with a high-level jet action.

The functioning of the flushing device is described in more detail hereinbelow. Starting from a closed closing flap 2, the radially outer seal 4 butts firmly against the sealing surface 6 and thus seals the annular gap 16. In this position, it is possible for the corresponding coupling device to stand alone or to be coupled to the respectively other coupling device.

When the two coupling devices have been coupled to one another, the radially outer seals 4 are relieved of positive pressure in the internal space 5 and contract. The closing flaps 2 can be pivoted together and the pharmaceutical powder can transfer.

Following completion of the transfer, the closing flaps 2 are closed again, in which case, before the radially outer seals 4 are subjected to pressure again in the internal space 5, air is passed as flushing medium, by a compressed-air generator, into the annular channel 12 via the valves 9 and 9' and is blown out through the annular gap 16. This means that residues of the transferred powder which have been deposited on the radially outer seal 4 and on the sealing surface 6 on the flange 1 are blown away.

The nozzle-like annular gap 16 here ensures a particularly good cleaning action of the air passing out.

Following the abovedescribed cleaning, the internal space 5 of the radially outer seal 4 is subjected to pressure and the seal 4 is pressed against the sealing surface 6 on the flange 1. This may be based on the fact that there are no residues of the transferred pharmaceutical powder remaining between the seal 4 and the sealing surface 6. The coupling devices may be moved away from one another.

In particular in the case of sensitive materials, which also include pharmaceutical powders, the specific technical devices need to be particularly clean. During transfer of different materials or also following the transfer of one material over a relatively long period of time, it is thus necessary from a technical point of view for the entire device to undergo separate cleaning in order that any residues which, despite great care and the use of the flushing device, may have contaminated the passageways of the flushing device are removed.

For this purpose, with the annular gap 16 closed, air is blown into the annular channel 12 via the connecting line 10 and is let out via the connecting line 10'. Following this preliminary cleaning operation, for the main cleaning operation, water is let into the annular channel 12 via the connecting line 11 and is let out via the connecting line 11'. Finally, for the purpose of blowing out any possible water residues, air is blown into the annular channel 12 again via the connecting line 10 and is let out via the connecting line 10'.

This procedure cleans more or less any impurity or contamination from the spaces of the flushing device with a high level of reliability. In this case, the rounded design of the annular channel and of the connecting lines proves to be particularly advantageous since it is not possible for any residues to become lodged in corners.

The process-related use of the flushing device may be varied within wide limits. Any desired gaseous or liquid substances may be used as the flushing media. It is also possible to change the direction of the flushing medium a number of times or to pulse the flushing medium through the flushing device.

The invention claimed is:

1. A flushing device for a sealing system of a housing and associated closing element, said housing having a housing sealing surface, said closing element having an outer elastic seal radially movable into sealing engagement with said sealing surface, wherein said closing element is positionable to lie adjacent said housing sealing surface with said outer elastic seal spaced therefrom to define an annular gap between said housing sealing surface and said closing element through which a flushing medium can pass, said annular gap being closable by the radial movement of said outer elastic seal into engagement with said housing sealing surface to define a closed position of said closing element, said housing further including an annular channel that is enclosed on all sides other than an opening through said housing sealing surface into said annular gap, said opening having at least one undulating or serrated edge to define a plurality of individual annularly-positioned outlets of nozzle-like design, said outlets defining said openings from said annular channel into said annular gap, wherein said flushing device further comprises a flushing medium source and a closable outlet in communication with said annular channel for passing flushing medium into said annular channel.

2. The flushing device as claimed in claim 1, wherein there are at least two sources for different flushing media.

3. The flushing device of claim 1 further comprising a pair of connecting lines between said closable outlet and said annular channel to provide flushing medium to said annular channel and a further closable outlet with a further pair of connecting lines between further closable outlet and said annular channel, said pair and further pair of connecting lines located at mutually opposite locations within said annular channel.

4. A process for using a device as claimed in claim 3, wherein, with said closing element in its closed position and the annular gap closed and with the closable outlet and further closable outlet open, a flushing medium is let into the annular channel from the source via said closable outlet and is let out via said further closable outlet.

5. The process as claimed in claim 4, wherein a liquid flushing medium and a gaseous flushing medium are passed, one after the other or alternately, at least through the annular channel.

6. The process as claimed in claim 4, wherein one or more flushing media are passed, one after the other or alternately, in opposite directions, through the annular channel via the closable outlet and further closable outlet.

* * * * *